United States Patent [19]

Zaino

[11] 4,447,967
[45] May 15, 1984

[54] SHOE WITH ITS VAMP ZONALLY COVERED WITH INJECTED PLASTICS MATERIAL SECURELY BONDED TO THE FABRIC

[75] Inventor: Luigi Zaino, Mortara (Pavia), Italy

[73] Assignee: Nouva Zarine S.p.A. Construzione Macchine E Stampi Per Calzature, Italy

[21] Appl. No.: 361,494

[22] Filed: Mar. 24, 1982

[30] Foreign Application Priority Data

Apr. 23, 1981 [IT] Italy ............................... 21560/81[U]

[51] Int. Cl.³ .......................... A43B 23/00; A43B 1/14
[52] U.S. Cl. ............................................ 36/45; 36/87
[58] Field of Search ................... 36/45, 47, 48, 83, 84, 36/87, 114, 129, 128

[56] References Cited

U.S. PATENT DOCUMENTS

| 2,034,091 | 3/1936 | Dunbar | 36/45 X |
| 2,147,197 | 2/1939 | Glidden | 36/45 X |
| 4,150,455 | 4/1979 | Fukuoka | 36/84 X |
| 4,342,160 | 8/1982 | Clark | 36/83 |

FOREIGN PATENT DOCUMENTS

| 71731 | 2/1943 | Czechoslovakia | 36/45 |
| 2484215 | 6/1980 | France | 36/87 |

Primary Examiner—James Kee Chi
Attorney, Agent, or Firm—Steinberg & Raskin

[57] ABSTRACT

A shoe comprises a sock formed of fabric material and a reinforcing structure of plastic material which is directly injected onto the sock. The reinforcing structure covers predetermined parts of the sock to form a toe region, a reinforcement for the heel region, an edging which surrounds the shoe opening, and one or more transverse bands, all parts of the reinforcing structure being mutually integral with each other. The sock comprises at least one lateral part forming an upper and a base part formed of a fabric which is less than the fabric forming the lateral part. The reinforcing plastic structure includes a shaped grid-like portion formed by mutually intersecting ribs which penetrate through the less dense fabric of the sock base part into the inside of the sock from its outside. The grid-like portion thereby constitutes gripping projections which bonds the plastic reinforcing structure securely to the sock and further functions as a support for an insole.

2 Claims, 4 Drawing Figures

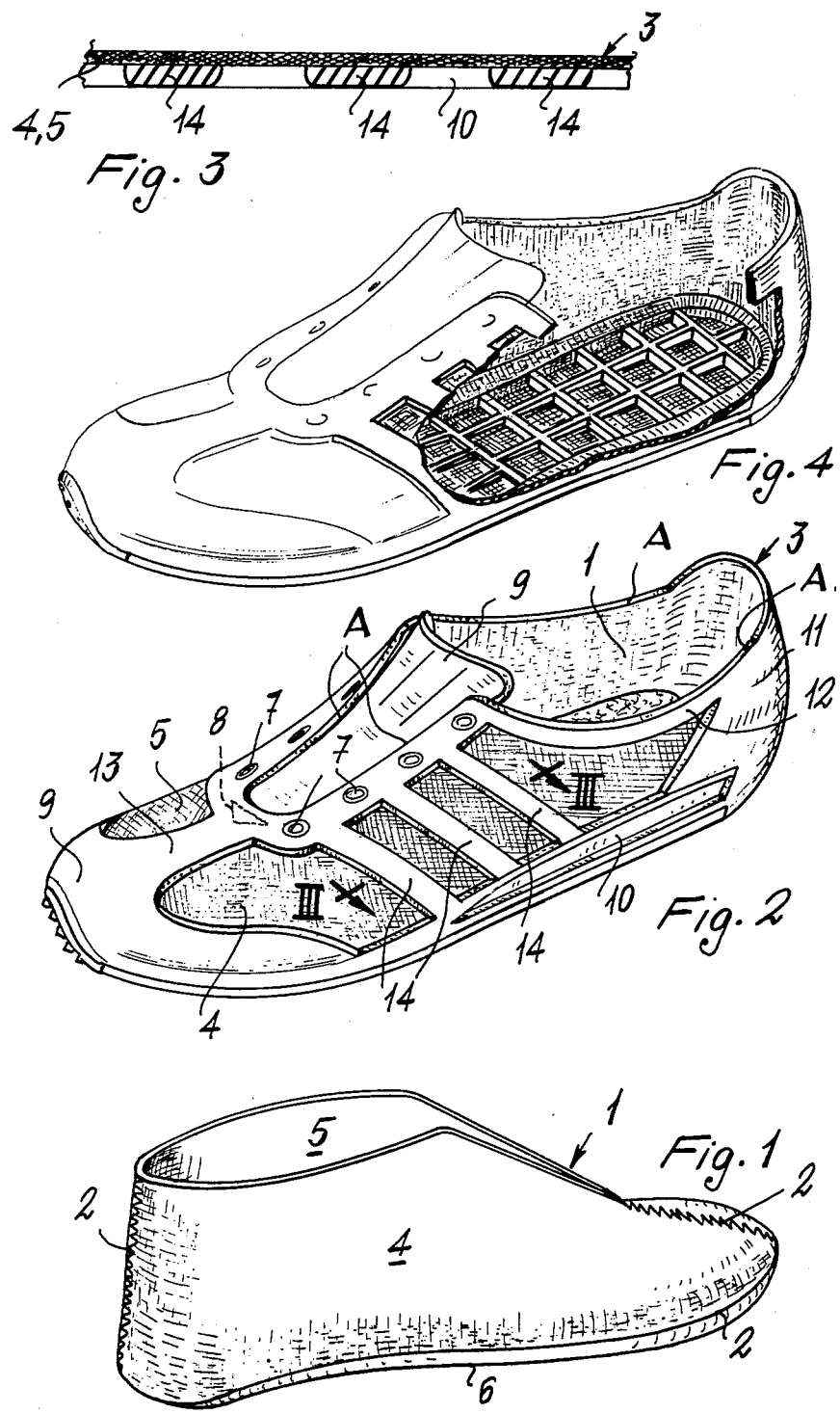

SHOE WITH ITS VAMP ZONALLY COVERED WITH INJECTED PLASTICS MATERIAL SECURELY BONDED TO THE FABRIC

BACKGROUND OF THE INVENTION

This invention relates to a shoe comprising a sole, toe and possible heel reinforcement of plastic material which is injected in one or more stages onto a vamp preferably in the form of a fabric sock.

In order to give them greater strength and longer life, known shoes of this type are reinforced or completed externally by leather elements fixed to the vamp by sewing. It is apparent that the manufacture of a shoe of this type requires considerable manual intervention (for cutting, gluing and sewing said elements).

SUMMARY OF THE INVENTION

The main object of this invention is to provide a shoe which can be produced more comfortably and simply than similar conventional shoes.

According to the invention, a vamp, which is preferably in the form of a sock of fabric or other material, is securely bonded to a reinforcing structure of plastic material which is directly injected onto the vamp in order to selectively cover the latter. The reinforcing structure is formed from mutually connected parts which preferably surround the shoe opening to form an edging, reinforce the toe and heel, and extend approximately transversely to the vamp in the form of bands.

DETAILED DESCRIPTION OF THE DRAWINGS

The invention will be more apparent from the detailed description given by way of example hereinafter with reference to the figures of the accompanying drawing, in which:

FIG. 1 is a perspective view of a fabric sock which in practice constitutes the shoe vamp;

FIG. 2 is a perspective view of the shoe according to the invention;

FIG. 3 is a partial section of the line III—III of FIG. 2 to an enlarged scale;

FIG. 4 is a perspective partly cut-away view of the shoe.

DESCRIPTION OF THE PREFERRED EMBODIMENT

With reference to the figures, the reference numeral 1 indicates the fabric sock formed from several parts joined together by sewn seams 2. This sock in practice constitutes the vamp of the shoe of FIG. 2, this shoe being indicated by the reference numeral 3. More specifically, the sock comprises two lateral parts 4, 5 and a base 6 part formed of a fabric which is less dense than the fabric forming the lateral parts 4 and 5. In order to produce the shoe, the sock is mounted on the male part of a mould, not shown, the mould being completed by two female parts which can be withdrawn from each other in order to remove the shoe from the mould, and which, together with the male part (or rather with the sock which covers it) define the space into which the plastic material is injected, the plastic material sets on the sock and combines securely therewith in order to convert the sock into a final shoe which lacks only the finishing operations. These finishing operations are limited to removing the excess sock material at the shoe opening (defined by the border A), to fitting the eyelets 7 for passage of the lace, to sewing the seam 8 for fixing the tongue produced separately (if it has not been injected simultaneously), and to inserting the insole 10, which is also produced separately.

The male mould part, which serves to define the inner shape of the shoe, is provided on its lower face from the foot arch to the heel with a set of mutually crossing grooves, the depth of which increases for a certain distance towards the heel zone. During the injection of the plastic material, the latter filters through the less dense fabric of the base 6 of the sock, and penetrates into the grooves of the mould to form inside the sock mutually intersecting ribs 15 forming a type of grid, shown in FIG. 4, which acts as a support for the insole, and which in this zone consequently bonds the sock securely to the plastic material. Thus, the ribs 15 which penetrate through the less dense fabric of the base part of the sock constitute gripping projections to bond the plastic material securely to the sock.

The injected plastic material forms on the sock a continuous reinforcing structure securely bonded to the sock. In the illustrated embodiment, the continuous reinforcing structure comprises the toe 9, the false welt which also forms the surround 10 for the sole, the sole itself either partly or completely (which can however be injected separately or subsequently), the heel reinforcement 11, a fillet or edging 12, which starts from the reinforcement 11 and follows the entire border A of the shoe opening, to allow the eyelets to be fitted in its front portion for passage of the lace, a fillet 13 which connects the edging to the toe at the front, and two sets of bands 14 (see FIG. 3), one on one side and one on the other side of the shoe, forming a binding and extending between the edging 12 and the false welt 10.

The plastic structure is indissolubly bonded to the vamp or sock, and forms therewith a simple, economical, robust and comfortable shoe comprising extended vamp zones which are not occupied by the plastic material, and through which perspiration can take place. The dimensions, materials and configuration of the plastic structure or vamp can obviously be different from those represented and described, and are therefore not limiting.

What is claimed is:

1. In footwear of the shoe type including a fabric sock to which a reinforcing plastic structure is connected, the improvement comprising:

said fabric sock including a fabric base part and at least one fabric lateral part forming an upper of the shoe, said base part being formed of a fabric which is less dense than the fabric forming the shoe upper; and said reinforcing plastic structure including a shaped grid-like portion formed by mutually intersecting ribs which penetrate through said less dense fabric of said sock base part into the inside of said sock from its outside, said grid-like portion constituting a support for an insole.

2. The combination of claim 1 wherein said fabric sock includes heel and toe regions and a region defining an opening into which a foot is adapted to be received, and wherein said reinforcing plastic structure includes integrally connected portions extending along substantially the entire region of the shoe opening, the heel and toe regions and on the outside of the sock along the base part thereof.

* * * * *